R. D. WILLIAMS.
DIAMETER GAGE.
No. 181,809.  Patented Sept. 5, 1876.
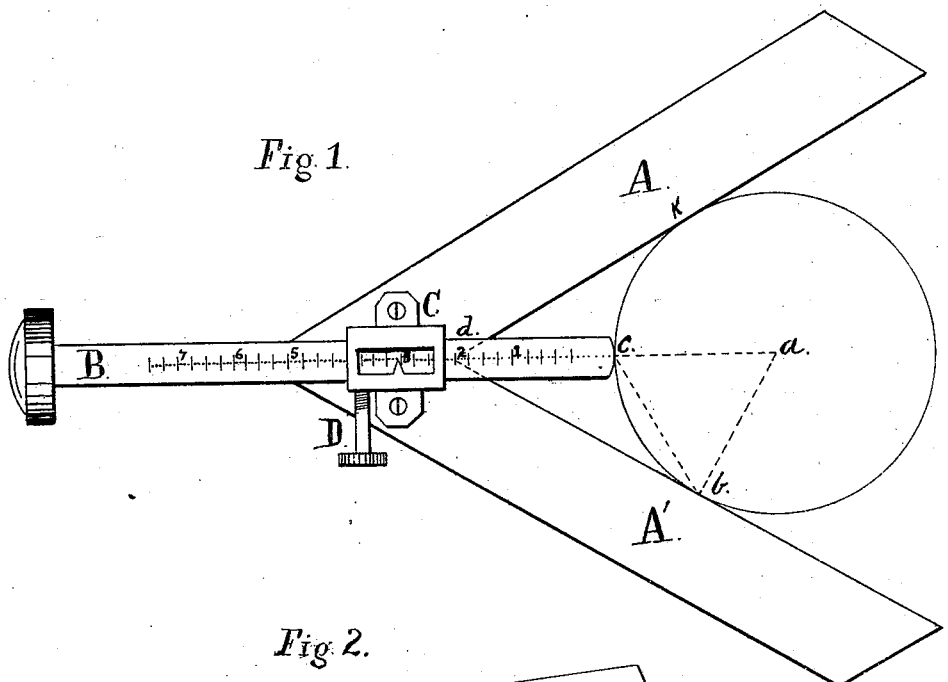
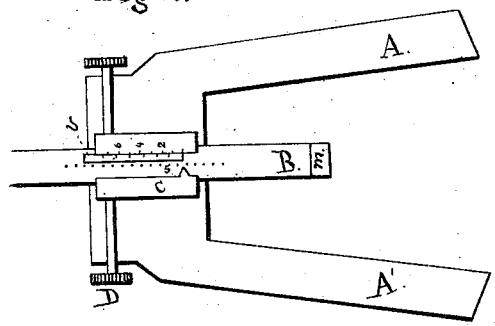
WITNESSES.
Geo. W. Stokes.
E. B. Clark
INVENTOR,
Rich'd Douglas Williams

UNITED STATES PATENT OFFICE.

RICHARD D. WILLIAMS, OF BALTIMORE, MARYLAND.

IMPROVEMENT IN DIAMETER-GAGES.

Specification forming part of Letters Patent No. 181,809, dated September 5, 1876; application filed August 7, 1876.

*To all whom it may concern:*

Be it known that I, RICHARD DOUGLAS WILLIAMS, of the city of Baltimore, State of Maryland, have invented certain new and useful Improvements in Diameter-Gages; and I hereby declare the same to be fully described as follows:

This invention relates to that class of devices in use for measuring the diameters of bodies having a circular cross-section; and it consists in the construction of a device adapted to subserve that end, as hereinafter fully described in connection with the accompanying drawings, in which—

Figure 1 is a plan view of my device; Fig. 2, a plan view of modification of the same.

Heretofore it has been customary, in measuring lathe-work, or the diameters of bodies circular in cross-section, to make use of calipers; but their use is attended with so many difficulties that the want of a better tool has long been felt.

Some of these difficulties may be mentioned: *e. g.*, with ordinary calipers two sources of error are possible, viz., in the comparison of the instrument with the work and with the scale. Again, calipers are liable to become "spread" in the act of using them, especially upon rapidly-revolving lathe-work, necessitating a constant comparison of the calipers with the scale; and, further, calipers do not admit of any great degree of accuracy of measurement being attained, and, where such is an object, other forms of gages, generally both cumbrous and expensive, must be used.

These difficulties are all obviated by the use of my device. As it bears its own scale, but one source of error is possible, viz., in the application of the device to the work, and its jaws, being of one piece of metal and having no joint, cannot spread.

In construction, my device consists of two rigid jaws, A A', struck from a piece of suitable metal and diverging at any desired angle, sixty degrees being preferred. At the junction of the jaws is a box, C, through which slides, with some little friction and in a direction bisecting the angle between the jaws, the graduated bar B. The box is cut away in the center, in order to exhibit the scale, and is also furnished with an index, $i$, and a thumb-screw, D, the latter being used to clamp the bar in any desired position.

In order to use the device, the bar B is moved forward until the scale indicates a diameter obviously greater than that of the object to be measured, which is then inserted between the jaws as far as it will go, pushing the bar before it. When the object touches both jaws and the bar at the same time, the true diameter is read off from the scale.

The theory of the operation is as follows: Let the angle $bdk = 60°$; then the triangle $abc$ will obviously be equilateral, and the triangle $dcb$ isosceles. The side $dc = cb = ba =$ radius of cross-section of the object to be measured. Hence, if the bar B is graduated in half-inches and numbered 1, 2, 3, 4, &c., it will indicate the true diameter instead of radius of the object.

The zero-point of the scale is placed as far from the end of the bar B as the index-point $i$ is from the vertex of the angle.

The bar B may be furnished with a projection, $m$, at right angles to its length, so that in measuring cylindrical work the axis of the work may be maintained at right angles to the plane of the gage.

When it is desired to turn a piece of wood or metal to any particular size the bar is set to that size and clamped by means of the thumb-screw D. The device is then applied to the work from time to time, as it is being turned down, until the end of the bar just touches the object, when it will have the indicated diameter.

It is clear that greater accuracy may be attained by diminishing the angle between the jaws, and for fine metal lathe-work sixty degrees would be too large, but for ordinary wood-work it answers perfectly well, and is accurate enough for all ordinary purposes.

It being remembered that the sides of triangles are proportionate to the sines of the angles opposite, the rate of graduation of the bar B for any angle of inclination of the jaws A A' is easily calculated: thus, calling the angle of the jaws $a$, we have $$d\,a : a\,b :: \text{Rad.} : \sin \tfrac{1}{2}a$$

and since $c\,a = a\,b$, $$-d\,c : a\,b :: \text{Rad.} - \sin \tfrac{1}{2}a : \sin \tfrac{1}{2}a$$

or the indicated radius : real radius :: Rad. $- \sin \tfrac{1}{2}a : \sin \tfrac{1}{2}a$.

When $x$ is made very small and a vernier, $v$, is attached to the box C, as shown in Fig. 2, the device I have described is capable of making measurements not excelled in accuracy by those of the micrometer-screw.

The jaws and bar may be of any desired material, preferably of tempered steel, and of any suitable size.

Other scales may also be attached to the device; for instance, the bar may be graduated metrically, as well as in inches, and the jaws may also bear an ordinary inch or metric scale on their inner or outer edges, or both.

Having thus described my invention, what I claim as new, and desire to secure by Letters Patent, is—

1. The combination of the jaws A A' and graduated bar B, substantially as described, and for the purpose set forth.

2. The combination of the jaws A A', graduated bar B, and clamp D, substantially as and for the purpose described.

RICHD. DOUGLAS WILLIAMS.

Witnesses:
 DE LANCEY H. BARCLAY,
 HENRY H. BURTON.